(12) United States Patent
Ryu et al.

(10) Patent No.: US 9,112,920 B2
(45) Date of Patent: Aug. 18, 2015

(54) HANDOFF SYSTEM AND METHOD FOR DUAL MODE TERMINAL

(75) Inventors: Young-Sook Ryu, Suwon-si (KR);
Jun-Hwa Seo, Suwon-si (KR);
Myeon-Kee Youn, Incheon (KR);
Seong-Joon Jeon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1472 days.

(21) Appl. No.: 11/526,023

(22) Filed: Sep. 25, 2006

(65) Prior Publication Data

US 2007/0197221 A1 Aug. 23, 2007

(30) Foreign Application Priority Data

Feb. 17, 2006 (KR) .............................. 2006-0015841

(51) Int. Cl.
*H04W 36/00* (2009.01)
*H04L 29/08* (2006.01)
*H04W 4/18* (2009.01)
*H04W 28/16* (2009.01)
*H04W 60/00* (2009.01)
*H04W 80/04* (2009.01)
*H04W 84/12* (2009.01)
*H04W 88/18* (2009.01)

(52) U.S. Cl.
CPC ............ *H04L 67/2828* (2013.01); *H04L 67/28* (2013.01); *H04W 4/18* (2013.01); *H04W 28/16* (2013.01); *H04W 36/0011* (2013.01); *H04W 60/00* (2013.01); *H04W 80/04* (2013.01); *H04W 84/12* (2013.01); *H04W 88/181* (2013.01)

(58) Field of Classification Search
CPC ..................................................... H04W 36/00
USPC .......................................................... 455/436
See application file for complete search history.

(56) References Cited

U.S. PATENT DOCUMENTS

| | | | |
|---|---|---|---|
| 6,871,070 B2 * | 3/2005 | Ejzak .......................... | 455/435.1 |
| 7,260,641 B2 * | 8/2007 | Decker et al. ................. | 709/233 |
| 2003/0195981 A1 * | 10/2003 | Graf et al. ..................... | 709/238 |
| 2005/0136920 A1 | 6/2005 | Rink et al. | |
| 2006/0014539 A1 * | 1/2006 | Oh ................................ | 455/436 |
| 2006/0128385 A1 * | 6/2006 | Lee et al. ....................... | 455/436 |

FOREIGN PATENT DOCUMENTS

KR 10-2003-0092302 B1 * 12/2003
KR 1020030092302 * 12/2003 ............... H04B 7/26

* cited by examiner

*Primary Examiner* — Huy C Ho (74) *Attorney, Agent, or Firm* — H.C. Park & Associates, PLC (57) ABSTRACT

In a handoff system and method for a dual mode terminal, the handoff system includes: a dual mode terminal which receives a message containing location information of a router of a second network while performing handoff from a first network to the second network, and which transmits a registration request message containing the location information of the router; and a home agent which transcodes data transmitted from a content providing server to be adapted for a bandwidth of the second network on the basis of information contained in the registration request message received from the dual mode terminal, and which transmits the transcoded data to the dual mode terminal.

14 Claims, 5 Drawing Sheets

HANDOFF SYSTEM AND METHOD FOR DUAL MODE TERMINAL

CLAIM OF PRIORITY

This application makes reference to, incorporates the same herein, and claims all benefits accruing under 35 U.S.C. §119 from an application for HANDOFF SYSTEM AND METHOD FOR DUAL MODE TERMINAL earlier filed in the Korean Intellectual Property Office on the 17th of Feb. 2006 and there duly assigned Serial No. 2006-0015841.

BACKGROUND OF THE INVENTION

1. Technical Field

The present invention relates to a handoff system and method for a dual mode terminal.

2. Related Art

Due to the burgeoning demand for wireless networking, various wireless technologies such as third generation (3G), wireless local area network (WLAN), wireless broadband Internet (Wibro), etc., have recently been introduced. To take full advantage of the available technologies, development of a dual mode terminal which supports two or more wireless technologies, such as WLAN, Ethernet, the WAN, etc., based on the 3G technology has begun.

Accordingly, handover to a network of another layer should be considered in order to support seamless and stable service.

A dual mode terminal receives a router advertisement (RA) message from a foreign network while performing a handover, and transmits only location information about care-of address (COA) depending on RA while transmitting a registration request message to a home agent (HA).

In other words, the dual mode terminal can move to the foreign network having a different bandwidth (e.g., Wibro<->WLAN, WLAN<->3G, . . . ) in the handover between heterogeneous networks.

Particularly, in the case where a dual mode phone receives a large volume of media content from a content-providing server, such as a video-on-demand (VOD) server, while moving from a wide-bandwidth network (e.g., WLAN 11 Mbps) to a narrow-bandwidth network (e.g., Wibro 1-3 Mbps), a high load may be applied to a foreign router when the HA directly transmits the content of the dual mode phone to the foreign router.

Thus, the foreign router cannot transmit relevant content to the dual mode phone normally, thereby causing service interruption or a mosaic phenomenon due to data loss.

SUMMARY OF THE INVENTION

It is an object of the present invention to provide a handoff system and method for a dual mode terminal, wherein a message which contains basic information about the terminal, information about networks, and information about whether a currently provided content service is transcoded, etc., as well as location information (COA) about a router of a new network, is sent to a home agent in a handover between heterogeneous networks of different bandwidths, so that the dual mode terminal can receive the currently provided content service adapted for the bandwidth of the new network.

A first aspect of the present invention provides a handoff system which comprises: a dual mode terminal which receives a message containing location information from a router of a second network while performing handoff from a first network to the second network, and which transmits a registration request message containing the location information of the router; and a home agent which transcodes data transmitted from a content providing server to be adapted for a bandwidth of the second network on the basis of information contained in the registration request message transmitted from the dual mode terminal, and which transmits the transcoded data to the dual mode terminal.

The location information of the router preferably includes a care-of address of the router.

The registration request message preferably includes one or more of information about each network, information about a flag which indicates whether transcoding is needed, and information about a media format decodable by the terminal.

The dual mode terminal preferably sets the flag to "1" when the data needs transcoding on the basis of information about a service bandwidth of the second network.

The dual mode terminal preferably sets the flag to "0" when the data does not need transcoding on the basis of information about a service bandwidth of the second network.

The home agent preferably includes: a registration information database for storing information contained in the registration request message received from the dual mode terminal; and a transcoding module for transcoding data transmitted from the content providing server to be adapted for the bandwidth of the second network on the basis of the transcoding information flag contained in the registration request message.

The registration information database preferably includes one or more of information about the dual mode terminal, information about an old/new network, and information about the flag that indicates whether transcoding is needed.

A second aspect of the present invention provides a dual mode terminal which includes a controller which receives a message containing location information from a router of a second network while performing handoff from a first network to the second network, and which transmits a registration request message containing the location information of the router to a home agent.

The location information of the router preferably includes a care-of address of the router.

The registration request message preferably includes one or more of information about each network, information about a flag which indicates whether transcoding is needed, and information about a media format decodable by the terminal.

The controller preferably sets the flag to "1" when the data needs transcoding on the basis of information about a service bandwidth of the second network.

The controller preferably sets the flag to "0" when the data does not need transcoding on the basis of information about a service bandwidth of the second network.

A third aspect of the present invention provides a home agent which includes a controller which transcodes data transmitted from a content providing server to be adapted for a bandwidth of a second network on the basis of information contained in the registration request message received from a dual mode terminal performing handoff from a first network to the second network, and which transmits the transcoded data to the dual mode terminal.

The registration request message preferably includes one or more of location information about the router of the second network, information about each network, information about a flag which indicates whether transcoding is needed, and information about a media format decodable by the terminal.

The location information of the router preferably includes a care-of address of the router.

The home agent preferably further includes: a registration information database for storing information contained in the registration request message transmitted from the dual mode terminal; and a transcoding module for transcoding data transmitted from the content providing server to be adapted for the bandwidth of the second network on the basis of the transcoding information flag contained in the registration request message.

The registration information database preferably includes one or more of information about the dual mode terminal, information about an old/new network, and information about the flag which indicates whether transcoding is needed.

A fourth aspect of the present invention provides a handoff method of a dual mode terminal, the method comprising the steps of: receiving a message containing location information from a router of a second network while performing handoff from a first network to the second network; transmitting a registration request message containing the location information of the router; and transcoding data transmitted from a content providing server to be adapted for a bandwidth of the second network on the basis of information contained in the registration request message, and transmitting the transcoded data to a relevant terminal.

The location information of the router preferably includes a care-of address of the router.

The registration request message preferably includes one or more of information about each network, information about a flag which indicates whether transcoding is needed, and information about a media format decodable by the terminal.

The registration request message containing the location information of the router is preferably transmitted after setting the transcoding information flag to "1" when the data needs transcoding on the basis of information about a service bandwidth of the second network.

The registration request message containing the location information of the router is preferably transmitted after setting the transcoding information flag to "0" when the data does not need transcoding on the basis of information about a service bandwidth of the second network.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Hereinafter, exemplary embodiments of the present invention will be described in detail with reference to the accompanying drawings, wherein like elements are identified by like reference numerals. For the sake of clarity and conciseness, matters related to the invention that are well known in the art will not be described.

Figure 1:
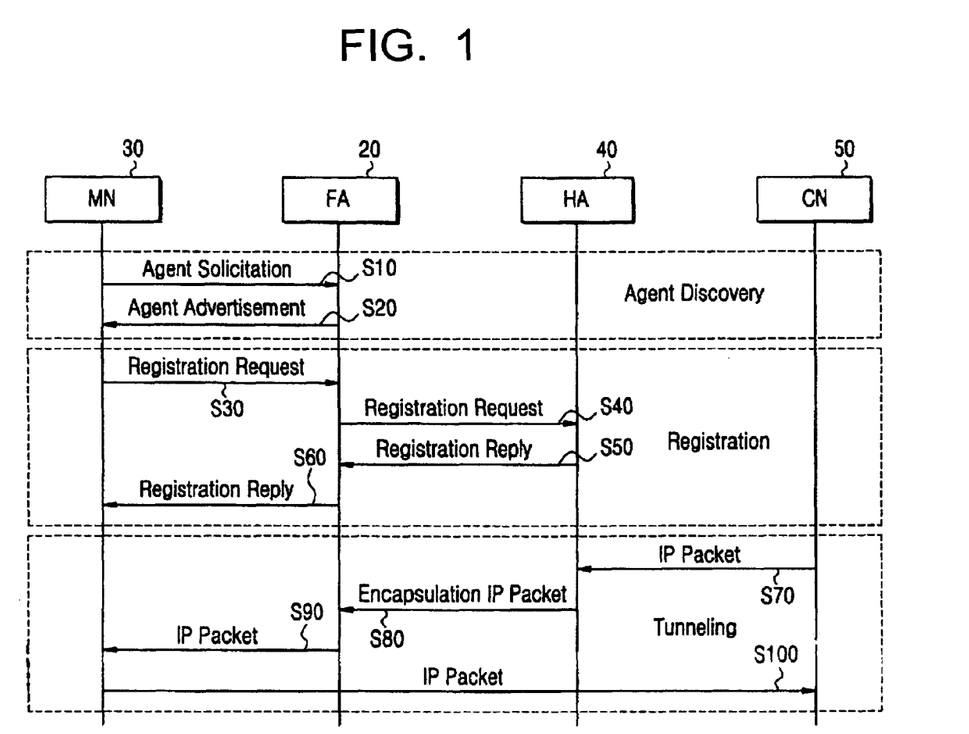
FIG. 1 is a diagram illustrating a handoff process of a dual mode terminal between heterogeneous networks.
Figure 2:
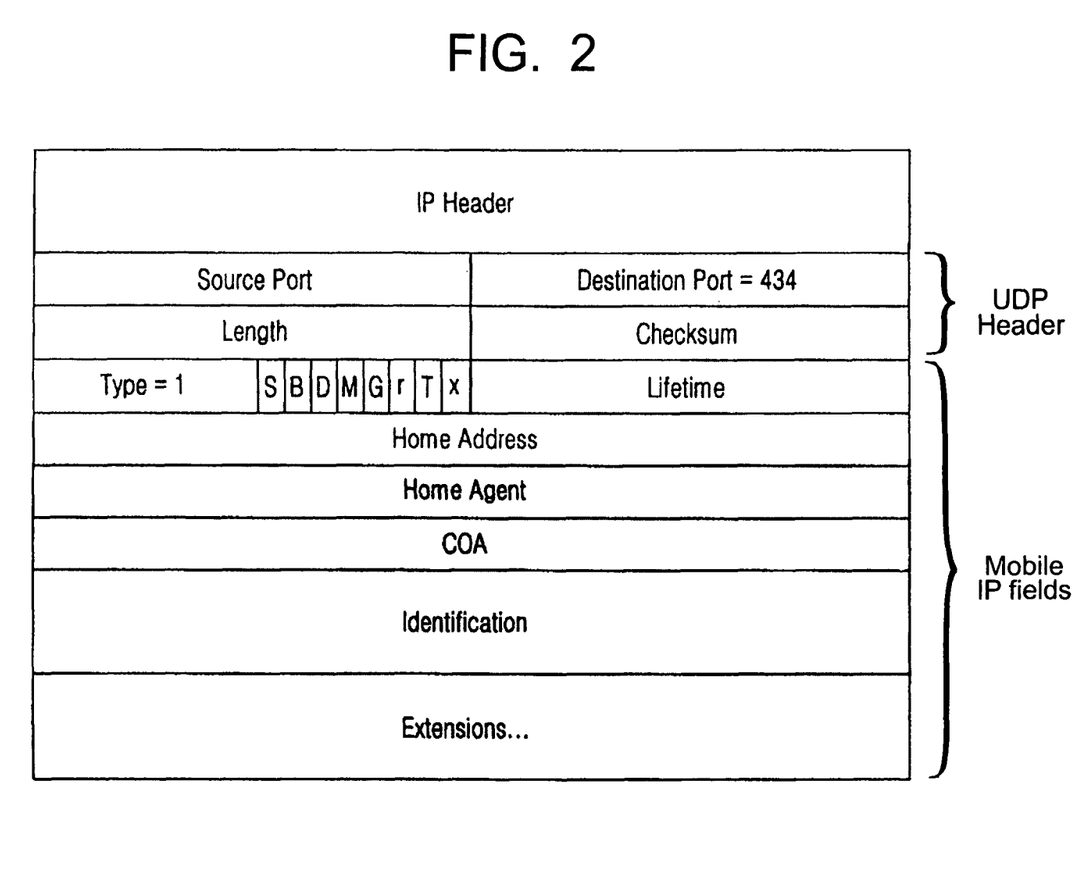
FIG. 2 is a diagram illustrating a registration request message format of the dual mode terminal.

FIG. 1 is a diagram illustrating a handoff process of a dual mode terminal between heterogeneous networks, and FIG. 2 is a diagram illustrating a registration request message format of the dual mode terminal.

As shown in FIG. 1, in step S10, a dual mode phone (mobile node: MN) 30 transmits an agent solicitation message to a foreign router (foreign agent: FA) 20 used as an Internet protocol (IP) sharing device in order to request location information (care of address: COA) of the foreign router (FA) 20 while performing handoff to a foreign network.

When the router (FA) 20 receives the agent solicitation message from the dual mode phone (MN) 30, it transmits an agent advertisement message containing its own location information (COA) to the dual mode phone (MN) 30 in step S20. Thus, a router discovery process is completed.

Then, in step S30, the dual mode phone (MN) 30 transmits a registration request message to the router (FA) 20 in accordance with the agent advertisement message received from the router (FA) 20.

In this regard, as shown in FIG. 2, the format of the registration request message is largely divided into an Internet protocol (IP) header, a user datagram protocol (UDP) header, and mobile IP fields.

The IP header contains information about an address of the dual mode phone (MN) 30, which is assigned by the home agent (HA) 40.

The UDP header is further divided into a source port field for storing source port information, a destination port field for storing destination port information, a length field and a checksum field.

Also, the mobile IP fields are further divided into a type field, a lifetime field, a home address field, a home agent field, a COA (location information) field, an identification field and an extensions field.

Particularly, a time value stored in the lifetime field of the mobile IP field indicates time (sec) remaining until expiration of the registration of the dual mode phone (MN) 30 performing the handoff to the foreign network.

For example, the lifetime field stores a time value of "0 (0:for deregistration)" when the dual mode phone MN 30 returns to an old network before performing the handoff, and a time value of "0xffff (0xffff:infinity)" when it is infinity.

Furthermore, the home address field stores an IP address of the dual mode phone 30, and the home agent field stores an IP address of the home agent (HA) 40.

The COA is the location information of the foreign router (FA) 20 used as the IP sharing device to be registered in the home agent (HA) 40 when the dual mode phone MN 30 performs the handoff to the foreign network, i.e., a heterogeneous network. However, when all kinds of COAs are deregistered, an IP address of the foreign router (FA) 20 is used as the COA.

Furthermore, identification is a numeral of 64-bits created by the dual mode phone MN 30, and is used for matching a request with a reply to identify integrity.

Then, in step S40 of FIG. 1, the router (FA) 20 transmits the registration request message from the dual mode phone (MN) 30 to the home agent (HA) 40.

In step S50, the home agent (HA) 40 transmits a registration reply to the router (FA) 20 in response to the registration request message received from the router (FA) 20.

In step S60, the router (FA) 20 transmits the registration reply to the dual mode phone (MN) 30. Thus, the registration process of the dual mode phone MN 30 is completed.

When a content-providing server (correspondent node: CN) 50 transmits an IP packet in step S70, the home agent (HA) 40 encapsulates the received IP packet and transmits it to the router (FA) 20 in step S80.

Then, the router (FA) 20 decapsulates the encapsulated IP packet received from the home agent (HA) 40, and transmits it to the dual mode phone (MN) 30, in step S90.

In addition, the dual mode phone (MN) 30 transmits a desired IP packet to the content providing server (CN) 50 in step S100. Thus, a tunneling process is completed.

In particular, the home agent (HA) 40 manages a registration table of the dual mode phone (mobile node: MN) 30, wherein the registration table is as follows.

For example, the registration table includes items such as the mobile node's home address, the foreign agent's care-of address, the identification field from the registration reply, the remaining lifetime of the registration, and the like.

Figure 3:
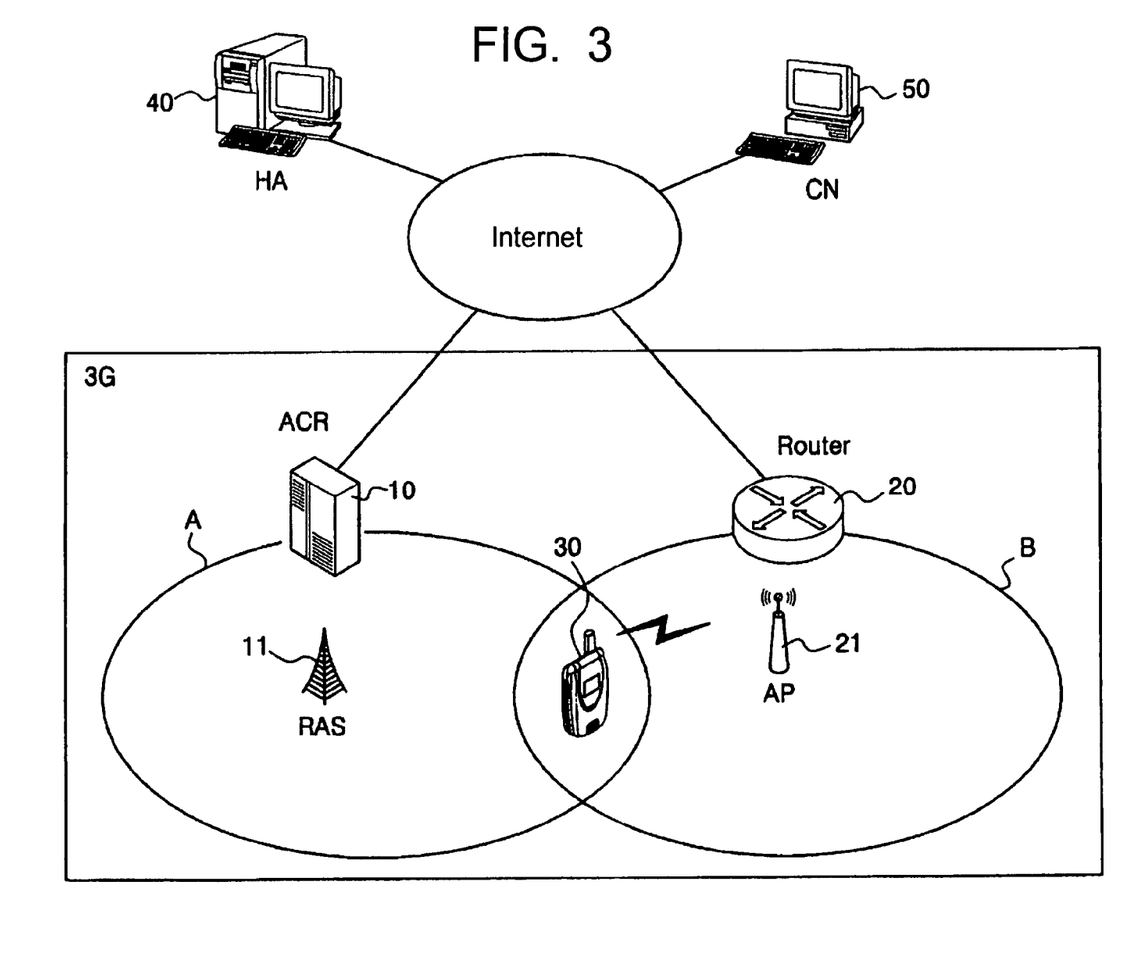
FIG. 3 is a diagram of a handoff system of a dual mode terminal according to an exemplary embodiment of the present invention.

FIG. 3 is a diagram of a handoff system of a dual mode terminal according to an exemplary embodiment of the present invention.

As shown in FIG. 3, a handoff system according to an embodiment of the present invention includes: a control station (access control router: ACR) 10 for a first service network A; a router (FA) 20 for a second service network B; a dual mode phone (MN) 30 capable of performing a handoff between the first service network A and the second service network B, which are heterogeneous networks; a home agent (HA) 40; and a content providing server (CN) 50.

It is assumed below that the first service network A and the second service network B are a Wibro and a WLAN, respectively.

The control station (ACR) 10 controls a base station (radio access station: RAS) 11 within the first service network A.

The router (FA) 20 transmits its own location information (COA) to the dual mode phone (MN) 30 at a time when the dual mode phone (MN) 30 requests the location information (COA) through an access point (AP) 21 while performing the handoff from the first service network A (Wibro) to the second service network B (WLAN).

The dual mode phone (MN) 30 is a wireless IP terminal which can perform the handoff between the first service network A and the second service network B, which are heterogeneous networks.

That is, the dual mode phone (MN) 30 receives a router advertisement (RA) message containing the location information (COA) from the router 20 of the WLAN while performing the handoff from the first service network (Wibro) A to the second service network (WLAN) B.

Thus, the dual mode phone (MN) 30 transmits the registration request message to the home agent (HA) 40 through the router (FA) 20 when it receives the router advertisement (RA) message.

In this regard, the registration request message transmitted to the home agent (HA) 40 contains not only the location information (COA) of the router advertisement (RA) message but also information (e.g., a kind, a bandwidth, and a flag which indicates whether transcoding is needed according to a current service) about a new network.

When the home agent (HA) 40 receives the registration request message from the dual mode phone (MN) 30 through the router (FA) 20, the home agent (HA) 40 checks the flag which indicates whether transcoding is requested according to the bandwidth of the new network.

As a result of checking the flag, when transcoding is requested, the home agent (HA) transcodes data from the content providing server (CN) 50, and transmits the transcoded data to the dual mode phone (MN) 30 through the router (FA) 20, thereby allowing the dual mode phone (MN) 30 to receive proper service from the new network.

Through the registration table, the home agent (HA) 40 manages old network information, new network information, an item that indicates whether transcoding is needed, etc., as well as basic mobile information about the dual mode phone (MN) 30.

In particular, the home agent (HA) 40 includes a transcoding module having a transcoding function for supporting a transcoding request of the dual mode phone (MN) 30.

The transcoding module of the home agent (HA) 40 can use a separate dedicated-transcoding server or a sub HA to reduce load.

That is, when the home agent (HA) 40 receives the transcoding request from the dual mode phone (MN) 30, the home agent (HA) 40 transcodes content received from the content providing server (CN) 50 to have a format adapted for a new network among formats decodable by the dual mode phone (MN) 30, and transmits the transcoded content to the dual mode phone (MN) 30 through the router (FA) 20.

The content providing server (CN) 50 is used as a server (e.g., a VOD server) for providing various kinds of content on the network, and transmits the relevant content to the dual mode phone (MN) 30.

Figure 4:
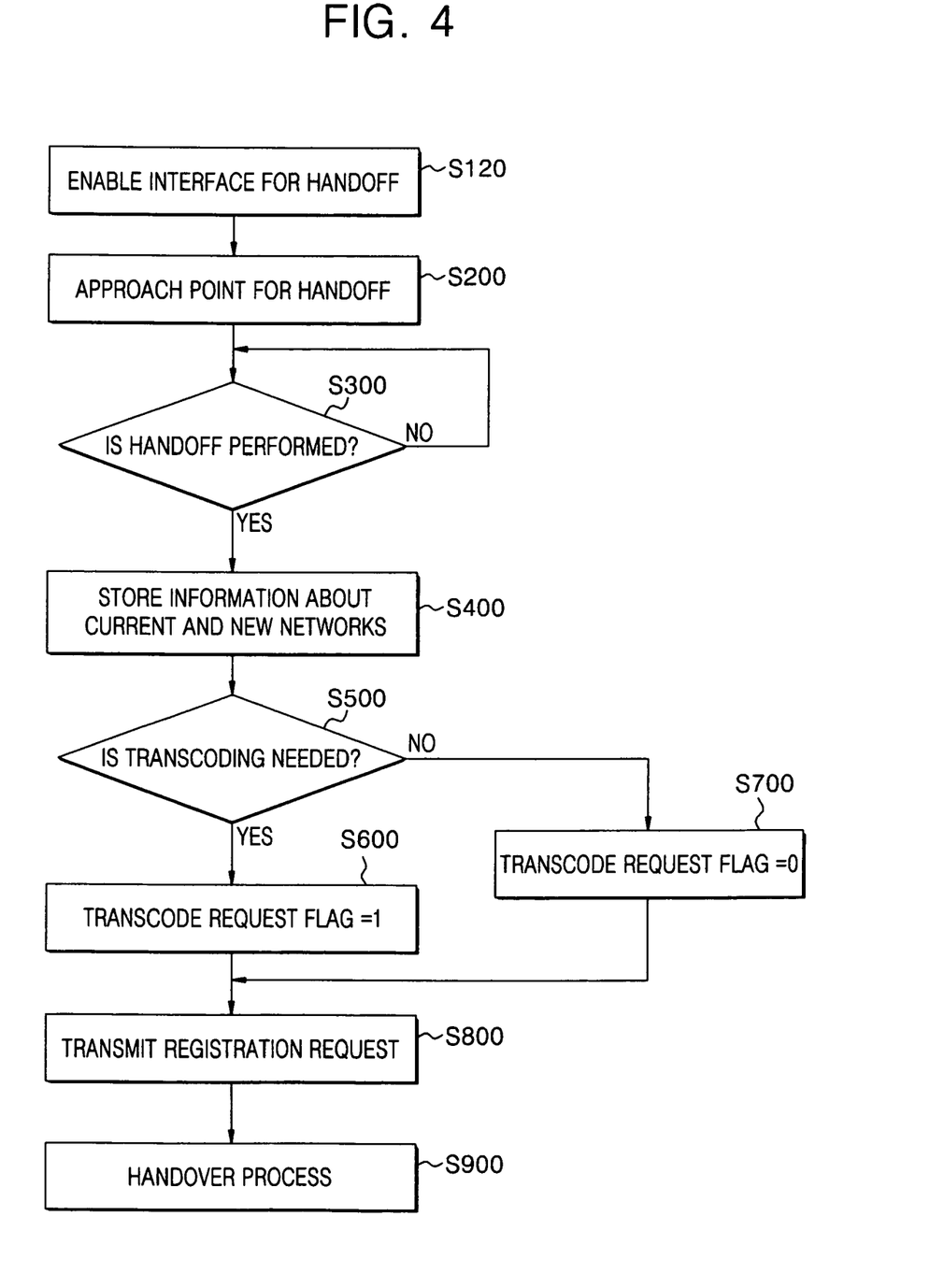
FIG. 4 is a flowchart of a transmission process of a registration request message of the dual mode terminal according to an exemplary embodiment of the present invention.

FIG. 4 is a flowchart of a transmission process of a registration request message of the dual mode terminal according to an exemplary embodiment of the present invention.

As shown in FIG. 4, the dual mode terminal enables an interface for the handoff in step S120, and then, when the terminal approaches a point for the handoff in step S200, it determines whether to perform the handoff in step S300.

In the case of performing the handoff ("YES" in step S300), information about a current network and a new network is stored in step S400.

Then, it is determined whether the currently provided data needs transcoding in step S500. When transcoding is needed, a transcoding flag is set to "1" in step S600. On the other hand, when transcoding is not needed, a transcoding flag is set to "0" in S700.

In other words, when the currently provided service can be transmitted without transcoding in a new network, even though the new network has a smaller bandwidth than the current network, a transcoding request flag is set to "0", and thus the home agent (HA) 40 does not perform transcoding, thereby reducing the load applied to the home agent (HA) 40.

Then, the registration request message containing the network information and the transcoding request flag is transmitted to the home agent (HA) 40 in step S800 so that the handoff process is performed in step S900.

Figure 5:
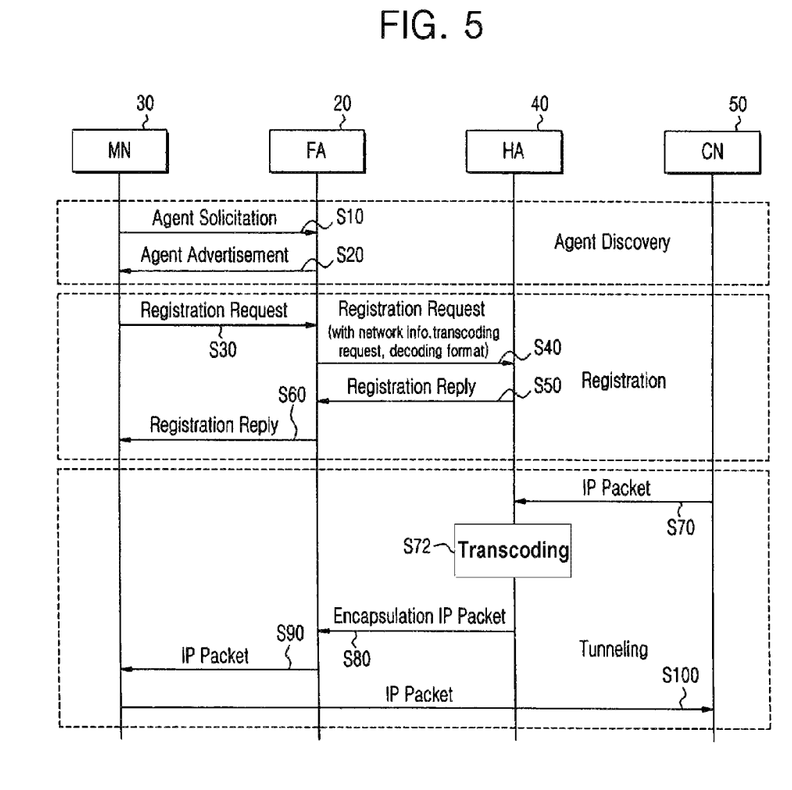
FIG. 5 is a diagram illustrating a handoff process of a dual mode terminal according to an exemplary embodiment of the present invention.

FIG. 5 is a diagram illustrating a handoff process of a dual mode terminal according to an exemplary embodiment of the present invention.

As shown in FIG. 5, a dual mode phone (MN) 30 transmits an agent solicitation message to a foreign router (foreign agent: FA) 20 used as an IP sharing device in order to request location information (care-of address: COA) of the foreign router (FA) 20 while performing handoff to a foreign network in step S10.

When the router (FA) 20 receives the agent solicitation message from the dual mode phone (MN) 30, it transmits an agent advertisement message containing its own location information (COA) to the dual mode phone (MN) 30 in step S20. Thus, the router discovery process is completed.

Then, in step S30, the dual mode phone (MN) 30 transmits a registration request message to the router (FA) 20.

In step S40, the router (FA) 20 transmits the registration request message from the dual mode phone (MN) 30 to the home agent (HA) 40.

Here, the registration request message contains network information, transcoding request information, decoding format information, etc.

In more detail, in the handover between heterogeneous networks which have different bandwidths, the dual mode phone (MN) 30 transmits information about the old network, information about the new network, information about whether transcoding is needed according to the currently provided application service, information about a media format decodable by the terminal, etc., as well as the location information (COA) of the router (FA) 20, to the home agent (HA) 40.

In step S50, the home agent (HA) 40 transmits a registration reply to the router (FA) 20 in response to the registration request message received from the router (FA) 20.

In step S60, the router (FA) 20 transmits the registration reply to the registration request message from the home agent (HA) 40 to the dual mode phone (MN) 30. Thus, the registration process is completed.

When the home agent (HA) 40 receives an IP packet from a content-providing server (CN) 50 in step S70, the home agent (HA) 40 transcodes the received IP packet to be adapted for the new network in step S72, and then encapsulates the transcoded IP packet into the router (FA) 20 in step S80. Then, the home agent (HA) 40 transmits the encapsulated IP packet to the router (FA) 20 in step S80.

When the home agent (HA) 40 receives an IP packet from a content-providing server (CN) 50 in step S70, the home agent (HA) 40 transcodes the received IP packet to be adapted for the new network in step S80, and then encapsulates the transcoded IP packet into the router (FA) 20 in step S90. Then, the home agent (HA) 40 transmits the encapsulated IP packet to the router (FA) 20 in step S90.

That is, the home agent (HA) 40 transcodes the currently provided data to be adapted to the new network when the dual mode phone (MN) 30 requests transcoding, and transmits the transcoded data to the router (FA) 20.

In this regard, when the currently provided service can be transmitted without transcoding in a new network, even though the new network has a smaller bandwidth than the current network, a transcoding request flag transmitted from the dual mode phone (MN) 30 to the home agent (HA) 40 is set to "0". Thus, the home agent (HA) 40 does not perform transcoding, thereby reducing the load applied to the home agent (HA) 40.

Thus, the router (FA) 20 decapsulates the encapsulated IP packet received from the home agent (HA) 40, and transmits the decapsulated IP packet to the dual mode phone (MN) 30, in step S90.

In addition, the dual mode phone (MN) 30 transmits a desired IP packet to the content providing server (CN) 50 in step S100. Thus, a tunneling process is completed.

According to an embodiment of the present invention, a message which contains basic information about a terminal, information about networks, and information about whether a currently provided content service is transcoded, etc., as well as location information (COA) about a router of a new network, is sent to a home agent in a handover between heterogeneous networks of different bandwidths so that the dual mode terminal can receive the currently provided content service adapted for the bandwidth of the new network, thereby providing the user with seamless and stable service.

While the present invention has been described with reference to exemplary embodiments thereof, it will be understood by those skilled in the art that various changes in form and detail may be made therein without departing from the scope of the present invention as defined by the following claims.

What is claimed is:

1. A handoff system of a dual mode terminal, comprising:
   a dual mode terminal which receives, from a router of a second network, a message comprising location information of the router of the second network while performing handoff from a first network to the second network, and which transmits a registration request message comprising the location information of the router of the second network; and
   a home agent which transcodes data transmitted from a content providing server to be adapted for a bandwidth of the second network on the basis of information provided in the registration request message transmitted from the dual mode terminal, and transmits the transcoded data to the dual mode terminal,
   the registration request message comprises at least one of information about each network, information about a transcoding flag which indicates whether transcoding is needed, and information about a media format decodable by the dual mode terminal.

2. The handoff system according to claim 1, wherein the location information of the router of the second network comprises a care-of address of the router of the second network.

3. The handoff system according to claim 1, wherein the dual mode terminal sets the transcoding flag to "1" when the data needs transcoding on the basis of information about a service bandwidth of the second network.

4. The handoff system according to claim 1, wherein the dual mode terminal sets the transcoding flag to "0" when the data does not need transcoding on the basis of information about a service bandwidth of the second network.

5. The handoff system according to claim 1, wherein the home agent comprises:
   a registration information database to store information provided in the registration request message received from the dual mode terminal; and
   a transcoding module to transcode data transmitted from the content providing server to be adapted for the bandwidth of the second network on the basis of the information about the transcoding flag provided in the registration request message.

6. The handoff system according to claim 5, wherein the registration information database comprises at least one of information about the dual mode terminal, information about an old/new network, and information about the transcoding flag which indicates whether the transcoding is needed.

7. A home agent comprising a controller which transcodes data transmitted from a content providing server to be adapted for a bandwidth of a second network on the basis of information provided in a registration request message received from a dual mode terminal performing handoff from a first network to the second network, and which transmits the transcoded data to the dual mode terminal,
   the registration request message comprises at least one of information about each network, information about a transcoding flag which indicates whether transcoding is needed, and information about a media format decodable by the terminal.

8. The home agent according to claim 7, wherein the location information of the router of the second network comprises a care-of address of the router of the second network.

9. The home agent according to claim 7, further comprising:
- a registration information database to store information provided in the registration request message received from the dual mode terminal; and
- a transcoding module to transcode data transmitted from the content providing server to be adapted for the bandwidth of the second network on the basis of the information about the transcoding flag contained in the registration request message.

10. The home agent according to claim 9, wherein the registration information database comprises at least one of information about the dual mode terminal, information about one of an old network and a new network, and information about the transcoding flag which indicates whether the transcoding is needed.

11. A handoff method of a dual mode terminal, comprising:
- receiving, from a router of a second network, a message containing location information of the router of the second network while performing handoff from a first network to the second network;
- transmitting a registration request message containing the location information of the router of the second network and
- transcoding data transmitted from a content providing server to be adapted for a bandwidth of the second network on the basis of information contained in the registration request message, and transmitting the transcoded data to a relevant terminal,
- the registration request message comprises at least one of information about each network, information about a transcoding flag which indicates whether transcoding is needed, and information about a media format decodable by the terminal.

12. The method according to claim 11, wherein the location information of the router of the second network comprises a care-of address of the router of the second network.

13. The method according to claim 11, wherein the registration request message comprising the location information of the router of the second network is transmitted after setting the transcoding flag to "1" when the data needs transcoding on the basis of information about a service bandwidth of the second network.

14. The method according to claim 11, wherein the registration request message comprising the location information of the router of the second network is transmitted after setting the transcoding flag to "0" when the data does not need transcoding on the basis of information about a service bandwidth of the second network.

* * * * *